G. W. ERNST & I. LUCAS.
Fly-Traps.
No. 138,797. Patented May 13, 1873.
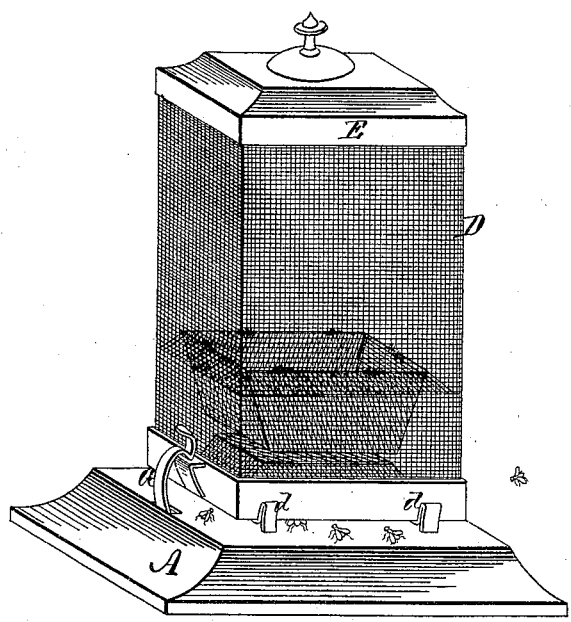
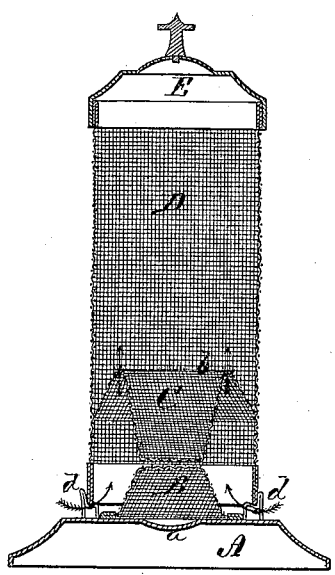
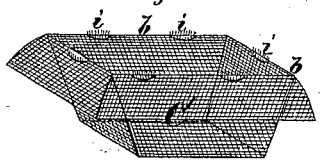
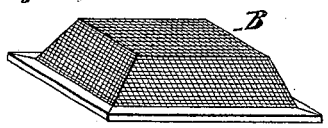

UNITED STATES PATENT OFFICE.

GEORGE W. ERNST AND ISAIAH LUCAS, OF FREMONT, OHIO.

IMPROVEMENT IN FLY-TRAPS.

Specification forming part of Letters Patent No. 138,797, dated May 13, 1873; application filed April 17, 1873.

*To all whom it may concern:*

Be it known that we, GEO. W. ERNST and ISAIAH LUCAS, of Fremont, in the county of Sandusky and in the State of Ohio, have invented certain new and useful Improvements in Fly-Trap; and do hereby declare that the following is a full, clear, and exact description thereof, reference being had to the accompanying drawing and to the letters of reference marked thereon, making a part of this specification.

The nature of our invention consists in the construction and arrangement of a fly-trap, as will be hereinafter more fully set forth.

In order to enable others skilled in the art to which our invention appertains to make and use the same, we will now proceed to describe its construction and operation, referring to the annexed drawing, in which—

Figure 1 is a perspective view, and Fig. 2 is a vertical section, of our fly-trap. Fig. 3 represents a wire-basket, and Fig. 4 a bait-cover used in the trap.

A represents the bottom or base of our trap, having one or more hollows or dishes, $a\ a$, stamped in the same to receive the bait. Over these hollows or dishes is a cover, B, made of wire-gauze. C represents a wire basket or cup, stamped in such a way as to form a ridge, $b$, around the entire trap, and is pierced at $i\ i$ to admit the flies to the upper chamber or prison. D is the wire-box or outside shell resting on feet $d\ d$, leaving a space of one-fourth of an inch wide around the entire trap, giving a large entrance for the flies. The box D is provided with a removable cover, E, and the box is held on the bottom by spring-catches G G. The flies enter on all four sides, crawl over the screen B, covering the bait, up the sides of the basket or cup C, through the small openings $i\ i$ in the ridge $b$, and into the upper prison, from whence they never return, and when full can be easily destroyed.

The bait, being covered, is not accessible; still has the tendency to draw by scent and sight. As the bait cannot be got at, the flies become very uneasy and restless, rambling around over the bait, up the sides of the outer screen (on inside) and the sides of the basket or cup seeking access to the bait, and at last, finding their way through the apertures $i\ i$ left to admit them, and are caught.

Where the bait is accessible, the greater portion of the flies are continually sitting and sipping, and the few that cannot find room are seeking, and are finally caught.

The basket or cup C, when the chamber above it is full, can be moved through from the bottom upward until the cover E rests upon it, when the flies will be all together in a small space, and can be easily destroyed by lighting a match or a small piece of paper and holding it under them for a moment, and they instantly die. The basket can then be emptied, and the trap is again ready for use, being always baited.

The apertures or openings $i\ i$ in the ridge of the basket or cup allow the insects to pass through easily, but in attempting to return the sharp wires form a barrier which they cannot overcome.

Having thus fully described our invention, what we claim as new, and desire to secure by Letters Patent, is—

1. The movable basket C, constructed as herein described, used in combination with the box D and movable cover E, the basket and box being made of gauze-wire, as and for the purposes set forth.

2. The combination of the bottom A with cups $a\ a$, wire-gauze cover B, removable wire-basket C, wire-box D, and movable top E, all the parts being constructed substantially as and for the purposes set forth.

In testimony that we claim the foregoing we have hereunto set our hands this 29th day of March, 1873.

GEO. W. ERNST.
ISAIAH LUCAS.

Witnesses:
JNO. ELWELL,
JAS. F. FRINK.